(12) United States Patent
Tamura

(10) Patent No.: US 6,436,264 B1
(45) Date of Patent: Aug. 20, 2002

(54) APPARATUS FOR ELECTRICALLY PRODUCING DEIONIZED WATER

(75) Inventor: Makio Tamura, Toda (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/331,256

(22) PCT Filed: Oct. 21, 1998

(86) PCT No.: PCT/JP98/04763

§ 371 (c)(1),
(2), (4) Date: Sep. 3, 1999

(87) PCT Pub. No.: WO99/20567

PCT Pub. Date: Apr. 29, 1999

(30) Foreign Application Priority Data

Oct. 21, 1997 (JP) .............................................. 9-306511
Oct. 31, 1997 (JP) .............................................. 9-315944

(51) Int. Cl.$^7$ ................................................... C02F 1/40
(52) U.S. Cl. ..................................................... 204/634
(58) Field of Search .................................. 204/631, 634

(56) References Cited

U.S. PATENT DOCUMENTS 4,033,850 A * 7/1977 Kedem et al. ............... 204/301

FOREIGN PATENT DOCUMENTS

| JP | 54-3826 | 2/1979 |
| JP | 60-235608 | 11/1985 |
| JP | 7-100391 | 4/1995 |
| JP | 7-236889 | 9/1995 |
| JP | 10-235358 | 10/1998 |

OTHER PUBLICATIONS

Shivan D. Archer et al.; "Electrochemical Deionization of Waste Water Using a New Polymer Membrane Cell"; *SAE Technical Papers* 972427; 27$^{th}$ International Conference on Environmental Systems; Lake Tahoe, Nevada; Jul. 14–17, 1997; pp. 1–9.

* cited by examiner

Primary Examiner—Bruce F. Bell
Assistant Examiner—Thomas H Parsons
(74) Attorney, Agent, or Firm—Fish & Richardson, P.C.

(57) ABSTRACT

A cation exchange membrane (11) and an anion exchange membrane (12) are alternately arranged between an anode (20) and a cathode (19). A desalination chamber (14) and a concentrating chamber (15) are alternately formed between both the exchange membranes (11), (12). Then, the desalination chamber (14) is formed to hold a channel through which liquid flows from one to the other side of the desalination chamber, and allow the cation exchange membrane (11) to contact the anion exchange membrane (12). There is thus obtained an electrodeionization water producing apparatus which maintains a deionizing efficiency as in a conventional case, has a simple structure, is easy to manufacture, and has a high degree of freedom of apparatus configuration.

20 Claims, 5 Drawing Sheets

# APPARATUS FOR ELECTRICALLY PRODUCING DEIONIZED WATER

BACKGROUND OF THE INVENTION

1. Field of the Invention

The present invention relates to an electrodeionization water producing apparatus used in the semiconductor manufacture industry, pharmaceutical industry, food industry, power stations, laboratories and the like which require deionized water.

2. Description of the Related Art

Basically in a conventional electrodialysis device, the liquid to be treated is desalinated and concentrated by supplying direct currents to a unit in which a plurality of cation and anion exchange membranes are alternately arranged via spacers and desalination and concentrating chambers are formed by the spacers, so that the anion and cation exchange membranes do not contact one another. Moreover, in an electrodeionization water producing apparatus heretofore practically used, a gap formed by the cation and anion exchange membranes is basically filled, for example, with a lamination of anion and cation exchange resin layers or a mixed ion exchange resin layer as an ion exchanger to form a desalination chamber. Feed water is passed through the ion exchange resin layer(s), while direct currents are applied via both ion exchange membranes, so that deionized water is produced while ions in the feed water are electrically discharged to concentrated brine flowing outside both the ion exchange membranes, and the anion and cation exchange membranes do not directly contact each other.

FIG. 5 is a schematic sectional view of a typical conventional electrodeionization water producing apparatus. As shown in FIG. 5, cation exchange membranes 101 and anion exchange membrane 102 are alternately arranged apart from one another, and every other space formed by the cation exchange membrane 101 and anion exchange membrane 102 is filled with a mixed ion exchange resin 103 of cation and anion exchange resins to form a desalination chamber 104. Moreover, portions formed by the anion and cation exchange membranes 102, 101 positioned adjacent to the desalination chambers 104 and not filled with the mixed ion exchange resin 103 are formed as concentrating chambers 105 for passing concentrated brine.

Moreover, as shown in FIG. 6, the cation exchange membrane 101, anion exchange membrane 102, and mixed ion exchange resin 103 (omitted from FIG. 6) filling the inside form a deionizing module 106.

Specifically, the cation exchange membrane 101 is sealed/attached on one side of a hollowed frame 107, the hollowed portion of the frame 107 is filled with the mixed ion exchange resin 103, and subsequently, the anion exchange membrane 102 is sealed/attached in the other side of the frame 107. Additionally, since the anion exchange membrane 102 is relatively soft, in general, a plurality of ribs 108 are vertically provided in the hollow space of the frame 107 in order to prevent the ion exchange membrane from being curved and prevent the layer filled with mixed ion exchange resin 103 from becoming non-uniform, when the inside of the frame 107 is filled with the mixed ion exchange resin 103 and opposite surfaces thereof are sealed with the ion exchange membranes.

Moreover, although not shown in the drawings, a feed water flow inlet is formed in an upper portion of the frame 107, while a deionized water flow outlet is formed in a lower portion thereof.

FIG. 5 shows that a plurality of deionizing modules 106 are arranged in parallel via spacers (not shown) disposed therebetween, a cathode 109 is disposed on one end of the arranged deionizing modules 106, and an anode 110 is disposed on the other end. Additionally, a space between the deionizing modules 106 disposed in parallel via the spacer is a concentrating chamber 105. Moreover, cation exchange membranes, anion exchange membranes, simple diaphragms having no ion exchange property or other compartment membranes 111 are disposed on opposite external sides of both end concentrating chambers 105 as required, and portions compartmentalized by the compartment membranes 111 and contacting both electrodes 109, 110 are formed as a cathode chamber 112 and anode chamber 113.

When deionized water is produced by the electrodeionization water producing apparatus, operation is performed as follows:

Specifically, a direct current voltage is applied between cathode 109 and anode 110, feed water flows in via a feed water flow inlet A, concentrated brine flows in via a concentrated brine flow inlet B, and electrode liquid flows in via electrode liquid flow inlets C and D. The feed water that flows in via the feed water flow inlet A flows downward in each desalination chamber 104 as shown by solid lines and arrows, and is passed through the filling layer of the mixed ion exchange resin 103, in which impurity ions are removed, and the deionized water is obtained via a deionized water flow outlet a. Moreover, the concentrated brine that flows in via the concentrated brine flow inlet B flows downward in each concentrating chamber 105 as shown by dotted lines and arrows, receives the impurity ions moving via both ion exchange membranes, and is discharged as the concentrated brine with the impurity ions concentrated therein via a concentrated brine flow outlet b. Furthermore, the electrode liquid that flows in via the electrode liquid flow inlets C and D is discharged via electrode liquid flow outlets c and d.

Since the impurity ions in the feed water are electrically removed, and concentrated in the concentrated brine by the operation described above, the deionized water can continuously be obtained without regenerating the filled ion exchange resins with chemicals.

When the conventional electrodeionization water producing apparatus is used, a reverse osmosis membrane device or a water softening device is usually installed as a pretreatment stage, so that the deionized water for use in various industries is supplied extremely effectively.

However, the conventional electrodeionization water producing apparatus has a complicated structure, and requires considerable time and labor to manufacture. Especially, the deionizing module forming the desalination chamber uses the frame with a plurality of ribs arranged in the hollow space to assure the filling of ion exchangers and uniform filling, which causes a problem that the configuration of the apparatus is restricted.

Therefore, an object of the present invention is to provide an electrodeionization water producing apparatus which maintains a deionizing efficiency as in a conventional case, has a simple structure, is easy to be manufactured and which has a high degree of freedom of apparatus configuration.

SUMMARY OF THE INVENTION

In such circumstances, the present inventor went back to a deionizing principle in an electrodeionization water producing apparatus, conducted a various studies and, as a result, has acquired the following information:

(1) A desalination chamber is filled with ion exchangers, i.e., ion exchange resins for the purpose of adsorbing ions in feed water. On the other hand, an ion exchange membrane is used for the purpose of transferring the ions adsorbed by the ion exchange resin to a concentrating chamber, and not transferring opposite ions of the concentrating chamber to the desalination chamber. Although the ion exchanger and the ion exchange membrane are different in purpose from each other, materials are substantially the same.

(2) When operation is performed without filling the ion exchange resins, the deionizing efficiency is remarkably deteriorated.

(3) Water electrolysis easily occurs in a portion where the ion exchange membrane and ion exchange resin come into contact with each other, and $H^+$ or $OH^-$ ions generated by the water electrolysis can be expected to chemically regenerate the ion exchange resin.

From the above (1) to (3), it has been found that when the desalination chamber is constituted by holding a channel for passing the feed water and allowing the cation exchange membrane to contact the anion exchange membrane, the same deionizing efficiency as in the conventional electrodeionization water producing apparatus can be obtained and an apparatus with a simple structure that is easy to manufacture and having a high degree of freedom of apparatus configuration can be obtained, and the present invention has been completed.

That is to say, according to the present invention, there is provided an electrodeionization water producing apparatus in which cation and anion exchange membranes are alternately arranged between an anode and a cathode, and desalination and concentrating chambers are alternately formed between both the membranes, the desalination chamber being formed by holding a channel for passing feed water from one to the other side of the desalination chamber and bringing the cation and anion exchange membranes into contact with each other.

Figure 1:
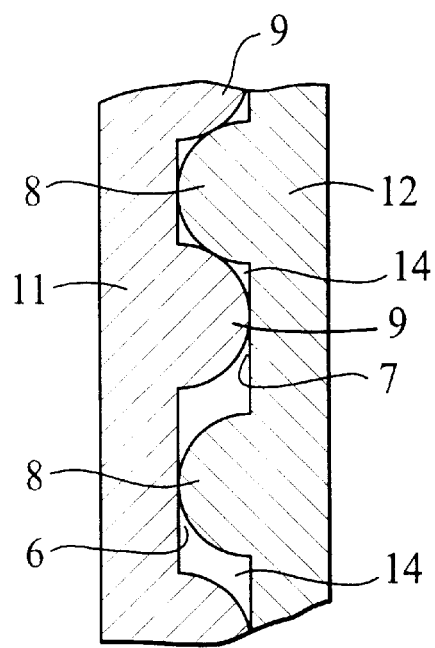
FIG. 1 is a schematic sectional view showing a part of a contact state of anion and cation exchange membranes in the present invention.

DESCRIPTION OF REFERENCE CHARACTERS 6, 7 groove
8, 9 protrusion
10 electrodeionization water producing apparatus
11, 101 cation exchange membrane
12, 102 anion exchange membrane
14, 104 desalination chamber
15, 105 concentrating chamber
16, 106 deionizing module
19, 109 cathode
20, 110 anode
21, 111 compartment membrane
22, 112 cathode chamber
23, 113 anode chamber
51 cation exchange membrane porous structure
52 anion exchange membrane porous structure
107 frame
108 rib
A feed water flow inlet
B concentrated brine flow inlet
C, D electrode liquid flow inlet
a deionized water flow outlet
b concentrated brine flow outlet
c, d electrode liquid flow outlet

DETAILED DESCRIPTION OF THE INVENTION

A desalination chamber of an electrodeionization water producing apparatus of the present invention is not especially limited as long as it is formed by holding channels for passing feed water from one side to the other side of the desalination chamber and bringing cation and anion exchange membranes into contact with each other, and it is formed without filling any ion exchanger. Examples of the cation or anion exchange membrane (hereinafter referred to just as the ion exchange membrane) holding the channels of feed water include the ion exchange membrane whose surface vicinity is formed in a porous structure, the ion exchange membrane having numerous fibrous protrusions on its surface, the ion exchange membrane having a nonwoven surface, the ion exchange membrane having numerous protrusions, and the like. The specified surface structure may be formed on the sides of the desalination chamber of both the cation and anion exchange membranes, or on a surface on the side of the desalination chamber of either cation or anion exchange membrane. Moreover, the specified structure or protrusions may or may not be formed on a surface on the concentration side of the cation or anion exchange membrane.

Furthermore, in the ion exchange membrane having the numerous protrusions, the protrusion configuration is not especially limited. For example, substantially hemispheric, hemispheric, conical or another protrusion; convex portion having a hemispheric, conical or linear, spiral, or amorphous pattern section; or the like may be formed. THe height of the protrusion is preferably in the range of about 1 to 3 mm. Moreover, for the aforementioned protrusion, 9 to 25 protrusions/cm$^2$ are preferably formed, while for the convex portion, a groove width is preferably in the range of 1.0 to 1.5 times a sectional width of the portion.

A method of forming the surface of the porous structure, nonwoven fabric surface or surface having numerous fibrous protrusions is not especially limited, and examples thereof include a laminating method of fixing an ion exchange membrane forming the porous structure or protrusions onto a surface of an ion exchange membrane heretofore used with an adhesive or the like, an integral forming method of forming the porous structure or protrusions during heating molding using a thermoplastic polymer, and the like.

Furthermore, a method of forming the ion exchange membrane having a large number of protrusions on its surface is not especially limited. For example, in a non-homogeneous membrane, a particulate ion exchanger is mixed in the membrane, and a configuration of the ion exchanger is used to make an ion exchange membrane surface protrude. Alternatively, after the membrane is prepared by this method, portions other than the ion exchanger may be cut off. Furthermore, for a semi-homogeneous membrane or a homogeneous membrane, an olefin resin or vinyl chloride resin net used as a membrane support is made concave/convex beforehand, and used to form protrusions. In membrane formation by bulk polymerization, a concave/convex surface is formed when a membrane is cut from a bulk article. In a heating molding method using a thermoplastic polymer or a pasting method, the concave/convex surface is formed during molding, or a part of a formed ion exchange membrane may be cut off.

Additionally, the contact state of the cation and anion exchange membranes is not especially limited. As described above, surfaces of cation and anion exchange membranes with the porous structure, protrusions or protruding portions formed thereon may just abut on each other. Thereby, voids are formed in the contact interface and in the vicinity of surface of the cation or anion exchange membrane, and the channels for passing the feed water are held.

Figure 2:
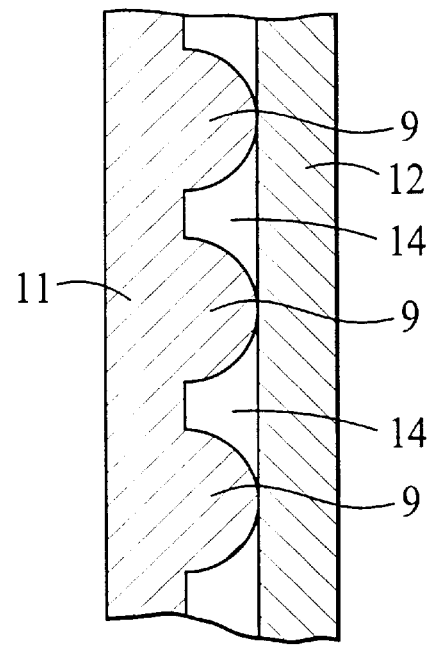
FIG. 2 is a schematic sectional view showing a part of another contact state of anion and cation exchange membranes in the present invention.

The contact state of the ion exchange membrane having the large number of protrusions may be appropriately selected in order to secure the voids as the feed water channels of the desalination chamber formed by contact of the cation and anion exchange membranes and in consideration of the deionizing efficiency, but especially, contacting of the protrusion with a groove of the opposite membrane is preferable. For example, when the protrusion is hemispheric, as shown in FIG. 1, a protrusion 9 of cation exchange membrane 11 abuts opposite to a groove 7 of anion exchange membrane 12, and a protrusion 8 of anion exchange membrane 12 abuts opposite to a groove 6 of cation exchange membrane 11. In this case, a top of protrusion 8, 9 may partially contact a bottom of groove 6, 7, but substantially the entire top of the protrusion preferably contacts the groove bottom. Moreover, when the anion exchange membrane 12 has no protrusion, as shown in FIG. 2, the protrusion 9 of cation exchange membrane 11 may abut on the anion exchange membrane 12.

In the present invention, a ratio of voids of the desalination chamber formed by the contact of cation and anion exchange membranes is not especially limited, but is preferably in the range of about 3 to 50% relative to a volume occupied by both the ion exchange membranes, for the ion exchange membrane whose surface vicinity has the porous structure and the ion exchange membrane having the non-woven fabric surface. Moreover, for the ion exchange membrane having the large number of protrusions, the ratio of voids of the desalination chamber indicates a percentage of voids (blank portions) formed by the cation exchange membrane 11 and anion exchange membrane 12 of FIGS. 1 and 2, relative to the entire volume of the desalination chamber. Specifically, the range is preferably 30 to 80%.

Figure 3:
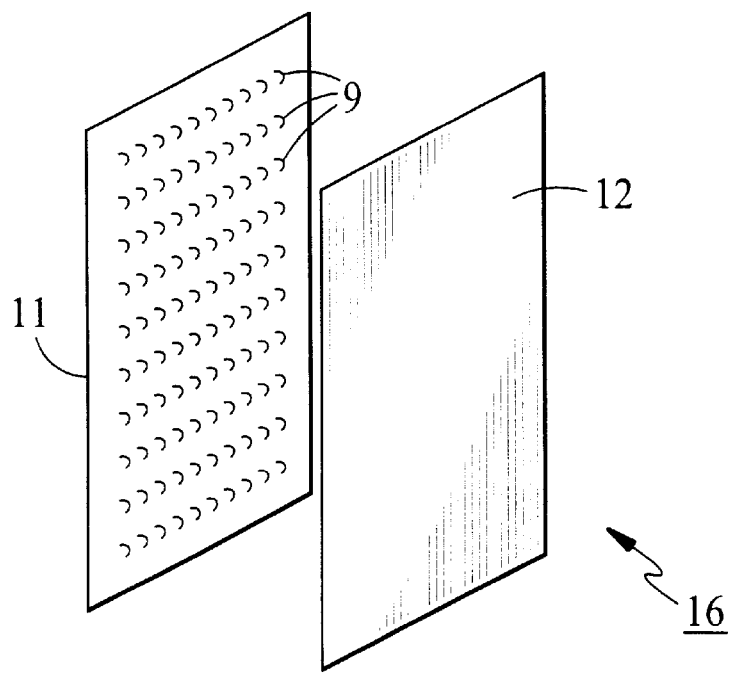
FIG. 3 is an assembly view of a deionizing module for use in an electrodeionization water producing apparatus of the present invention.

In the present invention, the deionizing module forming the desalination chamber is, for example, as shown in FIG. 3, formed by the cation exchange membrane 11 with a large number of protrusions 9 formed on its surface on the side of the desalination chamber and the anion exchange membrane 12 (surface protrusions of the anion exchange membrane 12 are not seen in the drawing). Moreover, various configurations of deionizing modules can be used and, for example, a spiral configuration may be used.

The desalination chamber of the electrodeionization water producing apparatus of the present invention is formed by bringing the cation and anion exchange membranes whose surfaces have the specified structure in contact with each other. The deionized water is produced by passing the feed water through the voids of the desalination chamber, applying direct currents via both the ion exchange membranes, and electrically discharging the ions in the feed water into the concentrated brine flowing outside both the ion exchange membranes.

Figure 4:
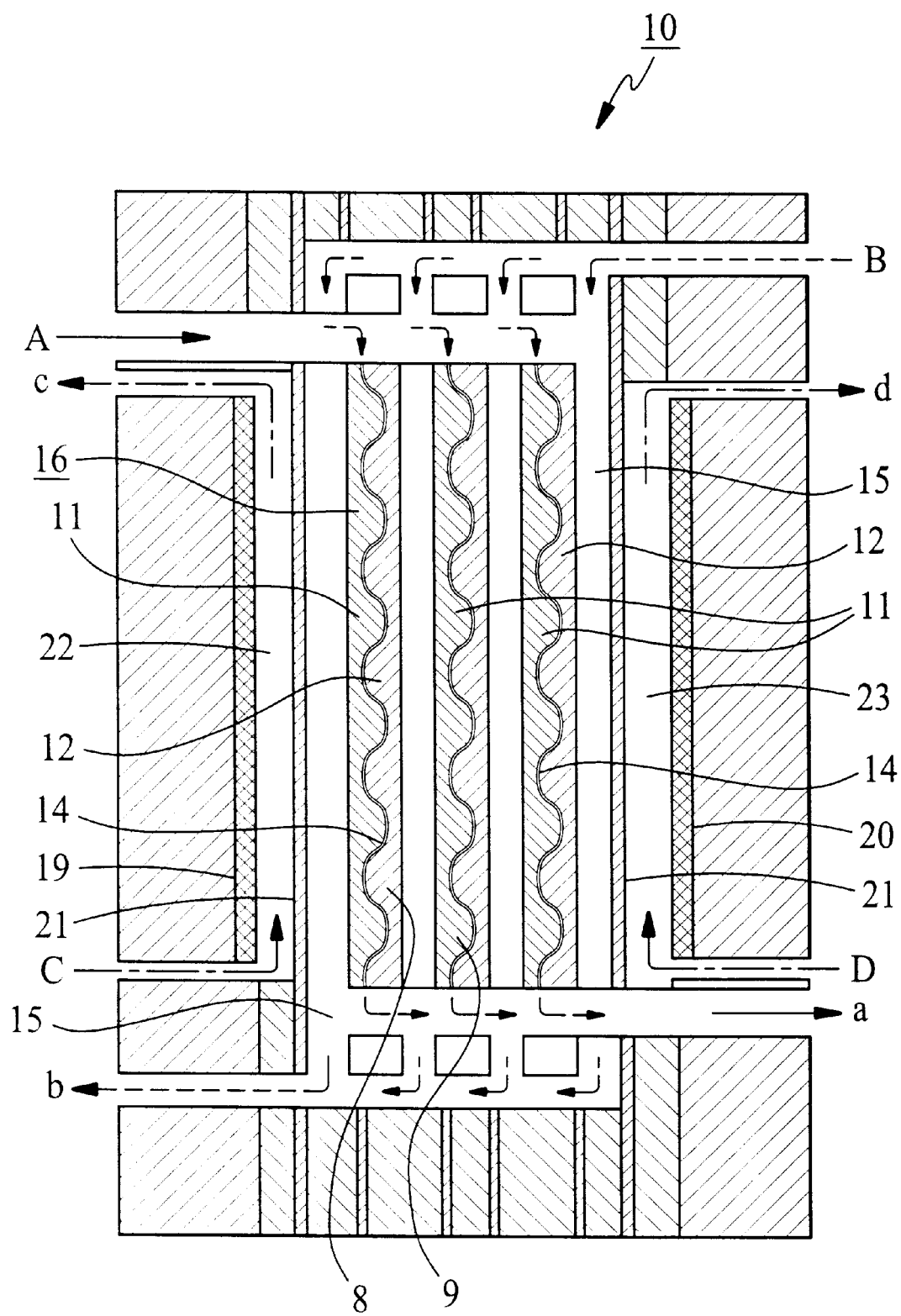
FIG. 4 is a schematic sectional view of the electrodeionization water producing apparatus in an embodiment of the present invention.
Figure 5:
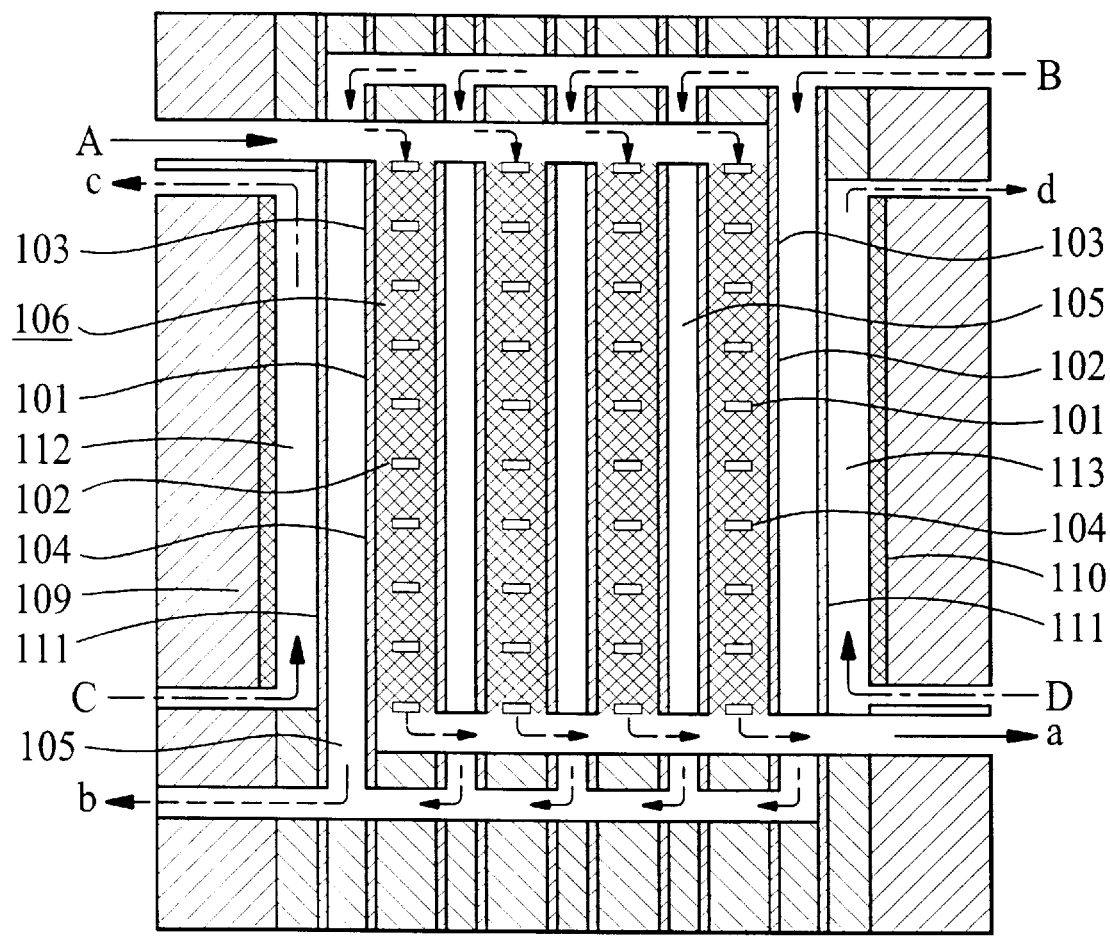
FIG. 5 is a schematic sectional view of a conventional electrodeionization water producing apparatus.

FIG. 4 is a schematic sectional view of an electrodeionization water producing apparatus in an embodiment of the present invention. As shown in FIG. 4, deionizing modules 16 each formed by engaging the cation and anion exchange membranes 11, 12 having a large number of hemispheric protrusions in contact with each other are alternately arranged apart from one another, and the voids each formed by the cation exchange membrane 11 and the anion exchange membrane 12 are formed as desalination chambers 14. Additionally, portions which are formed by the anion exchange membrane 12 and cation exchange membrane 11 positioned adjacent to the desalination chamber 14 and which form no protrusion are formed as concentrating chambers 15.

FIG. 4 shows that a plurality of deionizing modules 16 are arranged in parallel via spacers (not shown) disposed therebetween, a cathode 19 is disposed on one end of the arranged deionizing modules 16, and an anode 20 is disposed on the other end. Additionally, the position in which the spacer is disposed corresponds to the concentrating chamber 15. Moreover, cation exchange membranes, anion exchange membranes, simple diaphragms having no ion exchange property or other compartment membranes 21 are arranged on opposite external sides of both end concentrating chambers 15 as required, and portions compartmentalized by the compartment membranes 21 and contacting the electrodes 19, 20 are formed as cathode chamber 22 and anode chamber 23.

When deionized water is produced by the electrodeionization water producing apparatus, operation is performed as follows:

Specifically, a direct current voltage is applied between cathode 19 and anode 20. As a result, an electric current flows between cathode 19 and anode 20. Moreover, feed water flows in via a feed water flow inlet A, concentrated brine flows in via a concentrated brine flow inlet B, and electrode liquid flows in via electrode liquid flow inlets C and D. The feed water that flows in via the feed water flow inlet A flows downward in each desalination chamber 14 as shown by solid lines and arrows, and is passed through a channel formed by contact of protrusions, in which impurity ions are removed, and the deionized water is obtained via a deionized water flow outlet a. Moreover, water electrolysis takes place where the cation and anion exchange membranes directly contact with each other, which contributes to regeneration of the ion exchange membrane having adsorbed impurity ions by ion exchange. Furthermore, the concentrated brine that flows in via the concentrated brine flow inlet B flows downward in each concentrating chamber 15 as shown by dotted lines and arrows, receives the impurity ions moving via both the ion exchange membranes, and is discharged as the concentrated brine with the impurity ions concentrated therein via a concentrated brine flow outlet b. Furthermore, the electrode liquid flown in via the electrode liquid flow inlets C and D is discharged via electrode liquid flow outlets c and d.

Since the impurity ions in the feed water are electrically removed by the above-mentioned operation, the deionized water can be continuously obtained at the same deionizing ratio as in the conventional electrodeionization water producing apparatus. Moreover, the electrodeionization water producing apparatus 10 of the embodiment has a simple structure, and can be easily manufactured. Furthermore, since the deionizing module 16 is compact, the apparatus can be miniaturized. Additionally, the ion exchanger resin and their filling operation can be omitted.

According to the present invention, the electrodeionization water producing apparatus has a simple structure, and can be manufactured remarkably easily. Moreover, since the deionizing module is compact, the apparatus can be miniaturized. Furthermore, the ion exchanger resins and their filling operation can be omitted.

Figure 7:
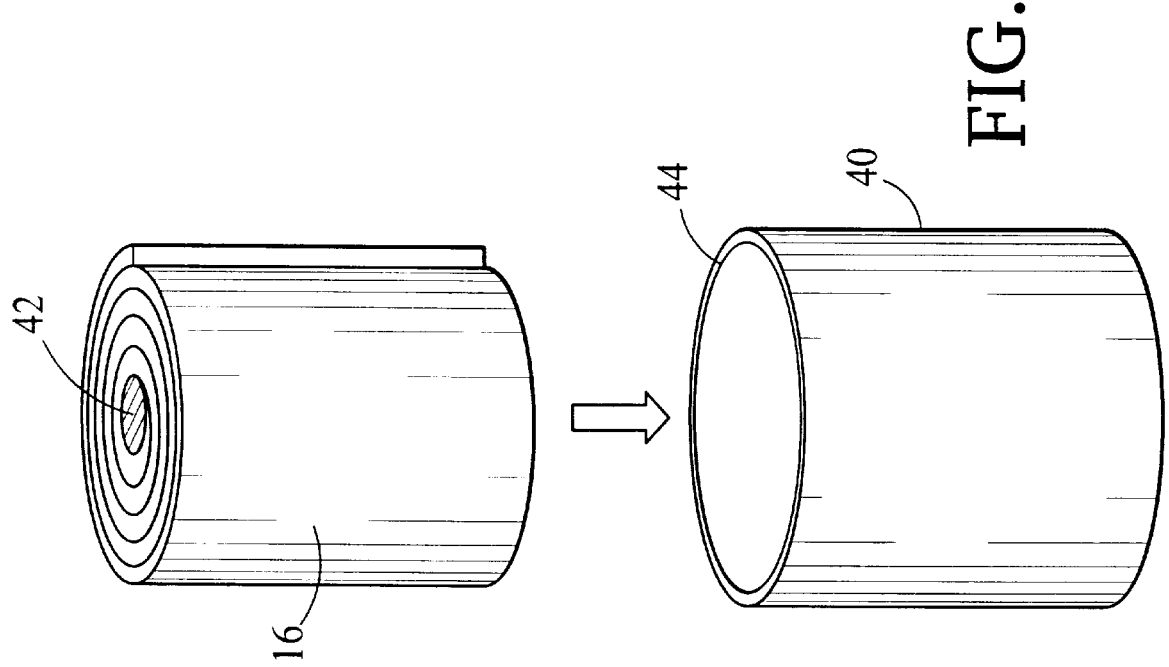
FIG. 7 is a schematic view showing an example using a spiral type deionizing module in the present invention.
Figure 6:
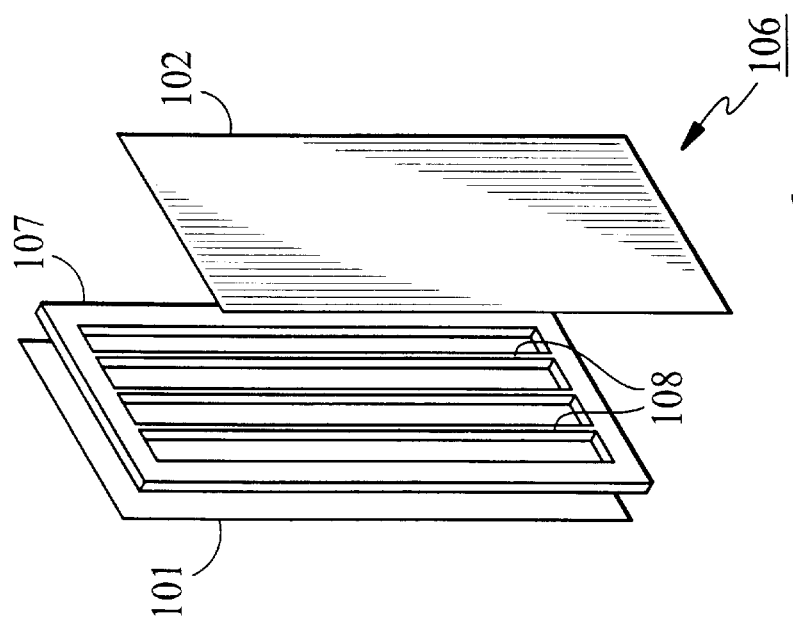
FIG. 6 is an assembly view of a deionizing module for use in the conventional electrodeionization water producing apparatus.

As diagrammatically shown in FIG. 7, the deionizing module 16 is formed in a spiral shape, a cylindrical pressure resistant container 40 is filled with the module, and portions on the side of the pressure resistant container and on the side of a spiral center are formed as electrodes 42, 44. In this case, an electrodeionization water producing apparatus can have its pressure resistant performance enhanced, and the degree of configuration freedom is remarkably enhanced compared with the conventional electrodeionization water producing apparatus.

Figure 8:
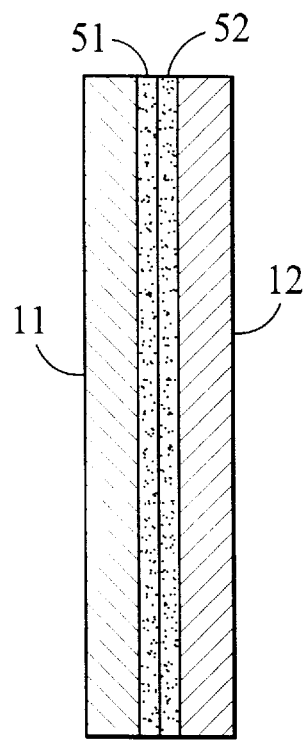
FIG. 8 is a schematic sectional view showing another example of a part of contact state of anion and cation exchange membranes in the present invention.

Furthermore, FIG. 8 shows an example in which a cation exchange membrane porous structure 51 is formed on a surface of cation exchange membrane 11. Moreover, an anion exchange membrane porous structure 52 is formed on a surface of anion exchange membrane 12. The cation exchange membrane porous structure 51 and the anion exchange membrane porous structure 52 are porous, form contact portions of both the exchange membranes 11, 12, and form a channel through which the feed water is passed.

Figure 9:
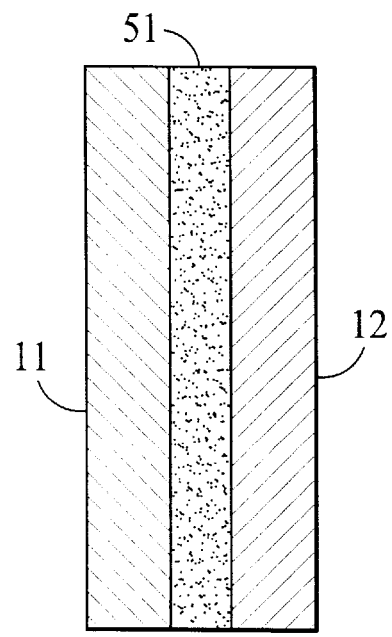
FIG. 9 is a schematic sectional view showing further example of a part of contact state of anion and cation exchange membranes in the present invention.

Additionally, FIG. 9 shows an example in which the cation exchange membrane porous structure 51 is formed on the surface of cation exchange membrane 11. The cation exchange membrane porous structure 51 directly contacts the anion exchange membrane 12, in which the cation exchange membrane porous structure 51 forms the channel for passing the feed water.

Possibility of Industrial Utilization

The electrodeionization water producing apparatus of the present invention is utilized in the semiconductor manufacture industry, pharmaceutical industry, food industry, or power stations, laboratories and the like which require deionized water.

What is claimed is:

1. An electrodeionization water producing apparatus in which a cation exchange membrane and an anion exchange membrane are alternately arranged between an anode and a cathode, and a desalination chamber and a concentrating chamber are alternately formed between both the membranes, said desalination chamber being formed by holding a channel through which feed water flows from one side to another side of the desalination chamber and by allowing the cation exchange membrane to contact the anion exchange membrane, wherein a large number of protrusions are formed on a surface of one of the cation exchange membrane and the anion exchange membrane, protrusions are not formed on the other of the cation exchange membrane and the anion exchange membrane, and the cation exchange membrane is allowed to contact the anion exchange membrane so that a portion where both the ion exchange membranes do not contact each other is formed as a channel through which the feed water flows.

2. The apparatus as claimed in claim 1, wherein at least a surface portion of the cation exchange membrane and/or the anion exchange membrane is formed in a porous structure, and in a portion of this porous structure, the cation exchange membrane is allowed to contact the anion exchange membrane, while the feed water is passed.

3. The apparatus of claim 1, wherein said protrusions include a convex portion.

4. The apparatus of claim 3, wherein the convex portion is hemispheric.

5. The apparatus of claim 3, wherein the convex portion is conical.

6. The apparatus of claim 3, wherein the convex portion is linear.

7. The apparatus of claim 3, wherein the convex portion is spherical.

8. The apparatus of claim 3, wherein the convex portion includes a groove having a width of between approximately 1.0 to 1.5 times a sectional width of the convex portion.

9. The apparatus of claim 1, wherein the desalination chamber includes voids formed by the contact of the cation exchange membrane and the anion exchange membrane and the voids comprise a volume of between approximately 3% and 50% of a volume occupied by the cation exchange membrane and the anion exchange membrane.

10. An electrodeionization water producing apparatus in which a cation exchange membrane and an anion exchange membrane are alternately arranged between an anode and a cathode, and a desalination chamber and a concentrating chamber are alternately formed between both the membranes, wherein:

said desalination chamber is formed by holding a channel through which feed water flows from one side to another side of the desalination chamber and by allowing the cation exchange membrane to contact the anion exchange membrane, a large number of protrusions are formed on a surface of the cation exchange membrane and a surface of the anion exchange membrane, and the cation exchange membrane is allowed to contact the anion exchange membrane, a top of the protrusion formed on the cation exchange membrane contacts an area in which the protrusion of the anion exchange membrane is not formed, and a top of the protrusion formed on the anion exchange membrane contacts an area in which the protrusion of the cation exchange membrane is not formed, so that a portion where both the ion exchange membranes do not contact each other is formed as the channel through which the feed water flows.

11. The apparatus as claimed in claim 10, wherein said protrusion is hemispheric.

12. The apparatus of claim 10, wherein said protrusions are conical.

13. The apparatus of claim 10, wherein a height of the protrusions are between approximately 1 mm and 3 mm.

14. The apparatus of claim 10, wherein the surface of the cation exchange membrane includes between approximately 9 protrusions per square centimeter and 25 protrusions per square centimeter.

15. The apparatus of claim 10, wherein the surface of the anion exchange membrane includes between approximately 9 protrusions per square centimeter and 25 protrusions per square centimeter.

16. The apparatus of claim 10, wherein the desalination chamber includes voids formed by the contact of the cation exchange membrane and the anion exchange membrane and the voids comprise a volume of between approximately 30% and 80% of a volume of the desalination chamber.

17. An electrodeionization water producing apparatus in which a cation exchange membrane and an anion exchange membrane are alternately arranged between an anode and a cathode, and a desalination chamber and a concentrating chamber are alternately formed between both the membranes, said desalination chamber being formed by holding a channel through which feed water flows from one side to another side of the desalination chamber and by allowing the cation exchange membrane to contact the anion exchange membrane, wherein:

a large number of protrusions are formed on a surface of one of the cation exchange membrane and the anion exchange membrane, protrusions are not formed on the other of the cation exchange membrane and the anion exchange membrane, and the cation exchange membrane is allowed to contact the anion exchange membrane so that a portion where both the ion exchange membranes do not contact each other is formed as the channel through which the feed water flows, and said protrusions include a convex portion having a groove with a width between approximately 1.0 to 1.5 times a sectional width of the convex portion.

18. The apparatus of claim 17, wherein:

at least a surface portion of the cation exchange membrane and/or the anion exchange membrane is formed in a porous structure, and in a portion of this porous structure, the cation exchange membrane is allowed to contact the anion exchange membrane while the feed water is passed.

19. The apparatus of claim 17, wherein heights of the protrusions are between approximately 1 mm and 3 mm.

20. The apparatus of claim 17, wherein the surface of the cation exchange membrane includes between 9 protrusions per square centimeter and 25 protrusions per square centimeter.

* * * * *